3,246,946
METHOD OF CREASE-PROOFING CELLULOSIC FABRICS AND FABRICS OBTAINED

John Leslie Gardon, Cheltenham, Pa., assignor to Rohm & Haas Company, Philadelphia, Pa., a corporation of Delaware
No Drawing. Original application May 9, 1961, Ser. No. 108,768. Divided and this application Feb. 19, 1963, Ser. No. 259,752
8 Claims. (Cl. 8—116.3)

This application is a division of my copending application Serial No. 108,768, filed May 9, 1961, now abandoned.

The present invention concerns the creaseproofing of cellulose fabrics, especially of cotton and rayon.

It has heretofore been suggested (Strain United States Patent 2,173,005) to prepare a polymer of an unsaturated amide, such as polymethacrylamide, to convert this polymer into the N-methylol derivative by means of formaldehyde and to impregnate the cellulosic fabric with an aqueous solution of such methylolated polymer. The impregnated fabric was then heated in the presence of an acidic catalyst for the purpose of reacting the polymer with the cellulose to cross-link the latter and impart resistance to creasing and wrinkling. This reaction, however, has an extremely superficial effect and is incapable of increasing the resistance to creasing to any practical extent. Any modification involving the impregnation of the fabric with a polymeric amide, methylolating in situ, and subsequently reacting under acid conditions gives similar results. A polymer cannot penetrate the fabric, and surface treatment thereby has little or no effect on the resilience.

It has also been suggested (Example II of United States Patent 2,173,005) to impregnate a cellulosic fabric with a methylolated monomer such as N-methylol-methacrylamide and then react the monomer with the cellulose in the presence of an acid such as tartaric acid. It has been found that this reaction results in the production of a compound having the Formula I:

$$CH_2=C(CH_3)CONHCH_2OCell \qquad (I)$$

wherein Cell represents the radical of the cellulose molecule. This product is not the cause of the increase in the resistance to creasing. Instead, the improvement in crease-resistance is obtained simply by virtue of the fact that the N-methylol monomer acts as a source of formaldehyde since under normal conditions, the N-methylol monomer is 20% dissociated and the reaction of the formaldehyde with the cellulose provides the cross-linking that imparts crease-resistance. The resulting product is capable of attaining a maximum of 120° in crease-recovery angle and is associated with the typical brittleness resulting from the short cross-links obtained from formaldehyde. That it is the cross-linking by reaction of the cellulose with formaldehyde which causes the improved crease-resistance is borne out by the fact that essentially the same results are obtained if the N-methylol-methacrylamide is replaced with N-methylol-propionamide which contains no point of ethylenic unsaturation.

The impregnation of the cellulose fabric with the N-methylol-acrylamide and reaction under alkaline conditions such as as are obtained by using potassium hydroxide (as in United States Patent 2,837,512) serves to increase the crease-recovery angle considerably by virtue of the formation of a cross-linked cellulose of the Formula II:

$$Cell—O—CH_2—CH_2CONHCH_2OCcell \qquad (II)$$

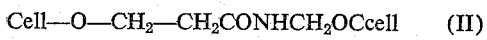

However, the product thereby obtained undergoes excessive loss in strength relative to untreated cellulose.

In the copending application of Gardon for United States Letters Patent Ser. No. 819,009 filed June 9, 1959, now U.S. Patent 3,125,405, an improved process for crease-proofing cellulosic materials has been disclosed which involves impregnation of the cellulose with N-methylol-acrylamide or the like and then providing conditions under which the amide is polymerized by vinyl addition (i.e., at the double bond) and also reacted with hydroxyl groups in the cellulose molecule.

In accordance with the present invention, it has been found that crease-proofed cellulose fabrics having improved properties in respect to tensile strength, lowered susceptibility to damage on chlorination (as in bleaching) and subsequent heating as in drying or ironing, and improved resistance to acid, as in typical laundry sours, can be obtained by a modification of the process described in the above-mentioned Patent 3,125,405 in which the N-methylol-acrylamide or the like is used in conjunction with limited proportions of one or more condensates of an aldehyde, especially formaldehyde, with urea, N,N'-ethyleneurea, N,N'-trimethyleneurea, an aminothriazine, such as melamine, or a 5-substituted-tetrahydro-s-triazone-2, the condensates of the latter having the formula:

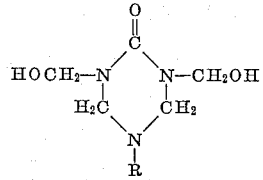

where R is selected from the group consisting of 2-hydroxyethyl, 2-hydroxypropyl, and alkyl groups having 1 to 4 carbons atoms.

Examples of the tetrahydro-s-triazones that may be employed include dimethylol-5-methyl-tetrahydro-s-triazone-2, dimethylol - 5 - hydroxymethyl-tetrahydro-s-triazone-2, dimethylol - 5 - ethyl-tetrahydro-s-triazone-2, dimethylol-5-n-propyl-tetra-hydro-s-triazone-2, dimethylol-5-isopropyl-tetrahydro-s - triazone-2, dimethylol-5-t-butyl-tetrahydro-s-triazone-2, dimethylol-5-n-butyl - tetrahydro-s-triazone-2, dimethylol-5-sec - butyl tetrahydro - s - triazone-2. These methylol derivatives may be termed a dimethylol-tetrahydro-s-triazone-2, and the condensate used may include the specific clear-cut compounds named or it may include a mixture of compounds containing the dimethylol compound. In any event, the formaldehyde condensates of this type may be obtained in known manner, such as by the condensation of a mixture of from 2 to 5 moles and preferably at least 2.5 moles of formaldehyde per mole of the tetrahydro-triazone in an aqueous solution thereof. The condensation may be effected at a pH of 6 to 8 at a temperature of 30 to 120° C. and preferably between about 80° to 210° C. The extent of condensation and the completion of the desired reaction may be controlled by varying the time and temperature.

The fact that the addition of one of the above condensates gives improved results is surprising since fabrics treated only with condensates of formaldehyde with melamine, urea, and cyclic urea derivatives, such as N,N'-ethyleneurea and N,N'-trimethyleneurea are well known to pick up chlorine during bleaching operations using chlorine, such as those using it in the form of a hypochlorite. On ironing the fabrics that have been bleached in this manner, severe discoloration and/or loss in tensile and/or tear strengths have generally resulted. In those cases where severe discoloration is encountered, the treatment with these condensates is unsuitable when a white fabric is ultimately desired. In some cases, as much as 90% loss in strength is encountered as a result of the action of heat as in ironing, on fabrics treated with these condensates and bleached with chlorine. The presence on a fabric of a thermoset condensate of formaldehyde with melamine frequently gives rise to some discoloration of the fabric on the mere treatment with a hypochlorite bleach, unless care is taken to avoid excess chlorine and elevated temperatures. Ironing in such cases serves to aggravate the discoloration.

Furthermore, fabrics treated only with any one of the 5 - substituted-dimethylol-tetrahydro-s-triazone-2 condensates are known to develop an unpleasant odor unless extreme care is taken to wash out by-products after the curing thereof on the fabric. In addition, the fabrics treated therewith frequently show discoloration on heating or ironing whether or not the fabrics have been treated with chlorine before the heating or ironing is effected. The fabric leaves the curing stage in distinctly yellow condition. Heating after chlorination aggravates this yellowing severely.

In accordance with the present invention, the cellulose material, in the form of fibers, filaments, woven or knitted fabrics or carded webs, or other fabricated structures, is impregnated with an N-methylol-acrylamide and one of the aforementioned formaldehyde condensates and then the treated fabric is subjected to conditions under which the acrylamide derivative is polymerized by vinyl addition (that is, at the double bond) and also reacted with hydroxyl groups in the cellulose molecule and the formaldehyde condensate is caused to polymerize by condensation with itself and/or the cellulose molecule and/or the N-methylol-acrylamide or the like. This may be accomplished by including within the impregnating solution used to apply the N-methylol-acrylamide and other formaldehyde condensate, or by applying to the fabric before or after such impregnation, a free-radical initiator for the addition polymerization of the monomer which is of acidic character or, if not acidic, the initiator is accompanied by an acid. In this manner, the amide monomer penetrates the cellulose material and polymerizes to provide a long-chain molecule which at numerous positions becomes attached to the cellulosic molecules by means of other linkages resulting from the reaction of the methylol groups in the amide polymer with the hydroxyl groups of the cellulose. At the same time, the other formaldehyde condensate undergoes condensation polymerization which is thought to involve the N-methylol-acrylamide and cellulose as well as itself.

Alternatively, the monomer may be polymerized by vinyl addition, using a free-radical initiator before or after reaction is effected with the cellulose through the methylol groups of either the N-methylol-acrylamide or the other formaldehyde condensate. If desired, the cellulose may first be impregnated with the N-methylol-acrylamide and a free-radical initiator which is of neutral character so that vinyl polymerization is essentially the only reaction occurring. Then the unpolymerized monomer and catalyst may be washed out of the fabric and finally the fabric may be impregnated with the other formaldehyde condensate and an acid catalyst followed by heating to cause condensation and reaction of the condensate with the N-methylol-acrylamide polymer and the cellulose. However, the simultaneous or one-step operation is preferred and is generally more efficient for a given amount of reagents.

By the procedure of the present invention, cellulose materials can have their resistance to creasing so greatly enhanced that crease-recovery angles as high as 145° or more are readily obtained. In addition, the loss in tensile strength as the result of chlorination followed by drying and ironing is markedly reduced as compared to that obtained when the monomeric N-methylol-acrylamide is used alone.

The resin-forming condensate used may be any water-soluble formaldehyde condensate of the aminotriazine, urea, or 5-substituted-tetrahydro-2-triazone-2 mentioned hereinabove.

In addition, the alkylated derivatives of these polymethylol condensates obtained from the lower alcohols from methyl through isopropyl may be employed. Examples include dimethoxymethylurea, diethoxymethylurea, dimethoxymethyl-N,N'-ethyleneurea, and so on. Again, it should be noted that the condensates employed may be fairly sharply defined compounds including those just named as well as others, or it may comprise mixtures of compounds of varying degrees of substitution wherein the number of methylol groups or alkoxymethyl groups may be different in the several compounds within the mixture.

The aqueous solution used to impregnate the cellulose may contain 1% or more of the N-methylol-acrylamide and/or the other condensate. The ratio (weight) of N-methylol-acrylamide to the other condensate should be in the range from 5:1 to 4:3 respectively. When operating at 100% wet pick-up, the bath may contain 8 to 15% by weight of the N-methylol-acrylamide and 3 to 6% by weight of the other condensate or mixture thereof. At higher or lower wet pick-up, the concentration of the respective ingredients should be correspondingly lower or higher respectively to assure that the amount of each component in the bath deposited on the fabric is substantially in the ranges just recited. For example, concentrations of 5% to 20% of the N-methylol-acrylamide are quite practical and 1% to 10% of the other condensate may be used.

The free-radical initiator employed is soluble in water or in a single-phase solution containing at least 20% water, such as mixtures of water with an alcohol, e.g., methanol or ethanol, or with a ketone, such as acetone. The initiator is preferably of water-soluble character so that it can readily effect polymerization in a completely aqueous medium. Preferred examples include ammonium persulfate and the alkali metal persulfates. These catalysts also are acid in character so that they serve to polymerize the monomer and also to react the methylol groups with the hydroxyls of the cellulose. The use of these catalysts or initiators is accordingly quite advantageous since they do not require the inclusion of additional acid though, if desired, small amounts of additional acid may be included in order to effect simultaneous vinyl polymerization and etherification or other condensation reactions.

A modification may involve the use of a neutral initiator such as azodiisobutyronitrile which, because of its water-insolubility, requires application by way of an organic solvent which is miscible with water. The use of this type of initiator is preferably followed by the application of the acid catalyst so that in effect, the monomer is first polymerized in situ within the cellulosic material and then when the acidic material, such as ammonium chloride, is added the methylol groups are reacted with each other and/or the hydroxyl groups of the cellulose.

Examples of acidic catalysts that may be employed include sodium bisulfate, ammonium chloride, the salts of mineral acids such as hydrochloric and sulfuric acid with amines such as 2-methyl-2-aminopropanol-1, para-toluenesulfonic acid, oxalic acid, lactic acid, acetic acid, and the like.

After impregnation with the initiator, with or without the additional acidic catalyst, the fabric may be dried and then heated at 105° to 205° C. to effect simultaneous polymerization condensation and cross-linking. In the two-stage procedure, a wet-phase polymerization may be effected by merely suspending the fabric in the aqueous solution of the N-methylol-acrylamide and the initiator, which solution is held at 25° to 100° C. until the polymerization is effected. Thereafter, the material is treated with an acidic catalyst and the other formaldehyde condensate and then dried and heated at 105° to 205° C. until the predetermined amount of cross-linking is obtained. Conversely, the fabric may be impregnated with the N-methylol-acrylamide and acidic catalyst with or without the other formaldehyde condensate but without the polymerization initiator, the impregnated fabric being thereafter dried and cured at 105° to 205° C. to react the N-methylol-acrylamide with the cellulose. Finally, the fabric is impregnated with a polymerization initiator or maintained in a solution thereof and polymerization is effected in either an essentially dry phase system at 100° to 205° C. or in a wet-phase system at 25° to 100° C. respectively.

The proportion of initiator which may be employed ranges from 5 to 10% by weight, based on the weight of total vinyl monomer (including any other vinyl monomer intended to be copolymerized in situ with the acrylamide monomer). When the initiator is supplemented with an acid or acidic material, the amount thereof may range from 0.1% to 3% by weight, preferably 0.5% to 2%, based on the weight of total solution and the amount of acidic catalyst may be about 0.05% to 1% by weight of the solution.

The properties of the product can be modified by including one or more additional vinyl monomers which do not react with the cellulose or other condensates so that in effect, a copolymer of the N-methylol-acrylamide reacts with the cellulose and the other condensate. Examples of comonomers (which must have appreciable solubility in water or in a single-phase aqueous medium containing 20% water as mentioned above in connection with the initiator) that can be employed include acrylonitrile, acrylic acid, acrylamide itself, vinyl pyrrolidinone, vinyl acetate, and esters of acrylic acid or methacrylic acid with alcohols having from 1 to 8 or more carbon atoms. Examples of such esters include methyl acrylate, ethyl acrylate, butyl acrylate, 2-ethylhexyl acrylate, butyl methacrylate, and 2-ethylhexyl methacrylate. Some monomers which have low water-solubility but which are soluble in another comonomer, such as 1-vinyl-2-pyrrolidinone, can be dissolved in the latter comonomer and then added to the aqueous medium by which it is to be applied to the fabric. The relative proportions between the N-methylol-acrylamide and the other monomer or monomers may vary widely. However, it is preferred that at least 50% by weight of the vinyl monomer mixture is N-methylol-acrylamide.

The products are wash-fast and have dry crease-recovery angles in the range of 120° to 145° or more. Even after five Sanforize washes, the dry crease-recovery is substantially unchanged. The fabric undergoes no appreciable discoloration as a result of the treatment and it undergoes no discoloration as a result of chlorine-bleaching and ironing short of the scorching temperature. The hand of the products is generally quite soft, and this can be modified appreciably, as desired, by selection of comonomers and proportions thereof. The moisture regain, though reduced somewhat, is still adequate for comfort.

The treatment of the present invention may be applied to any textile material containing cellulosic fibers or yarns and the textile material may be in the form of woven or knitted fabrics or "non-woven" fabrics derived from carded webs or from fibrous or filamentous webs obtained in any suitable fashion, such as air-deposition, wherein the fibers or filaments are distributed in a random array. The treatment may also be applied to yarns, threads, or other plied structures, or it may be applied to fibers or filaments in the form of loose or bulk masses or in the form of more or less compacted webbing, matting, or batting. In all fibrous structure having the fibers in heterogeneous array, the treatment renders the textile more resilient.

The fabrics or fibrous masses that may be treated are preferably those which contain a predominant proportion of cellulosic fibers and/or filaments, by which is meant that the cellulosic fibers constitute more than 50% of the total fibers by weight. It is particularly useful with textile materials of cotton, viscose rayon, cuprammonium cellulose rayon, linen, ramie, as well as textile materials comprising fibers and filaments of two or more of such cellulose materials. At the time of treatment with the cross-linking agent of the present invention, the fabric may be in the greige state or it may have been previously bleached, dyed, and/or printed or otherwise finished.

If desired, the treatment with the N-methylol-acrylamide and other condensate may be supplemented by a treatment with a hand-modifier or builder, softener, or water-repellent agents. Such modifying agents may be applied simultaneously by way of the same aqueous solution of the N-methylol-arcylamide and/or condensate or they may be applied to the fabric before or after the application of the N-methylol-acrylamide and/or condensate by a separate operation.

As water-repellent materials which also serve to soften the textile material, there may be used those quaternary ammonium compounds having a long-chain hydrocarbon group, such as stearamidomethylpyridinium chloride, stearyl pyridinium chloride, octadecyloxymethylpyridinium chloride, and the various quaternary ammonium salts described in United States Patent 2,351,581. The amount of water-repellent or softener may be as much as 5% and is preferably in the range of about 1 to 3% in the aqueous medium by which it is applied, assuming 100% wet pick-up. When it is applied solely for the purpose of softening, there may be employed as little as 0.1%.

Examples of auxiliary agents for enhancing the crease-resistance, for hand-building, for increasing tear strength, or for improving abrasion-resistance which can be applied in aqueous media include aqueous dispersions of water-insoluble linear addition polymers of one or more monoethylenically unsaturated monomeric compounds. Examples include water-insoluble copolymers of 0.5 to 8% by weight of acrylic acid, methacrylic acid, and itaconic acid. Any one or more of these monoethylenically unsaturated acids may be copolymerized with one or more other copolymerizable compounds containing a single vinylidene group, such as esters of acrylic acid or methacrylic acid and monohydric alcohols such as methyl, ethyl, butyl, octyl, dodecyl, cyclohexyl, cyanoethyl, aminoethyl, and the like; esters of itaconic acid and the above alcohols; esters from maleic, fumaric, or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substutited amides of these types; vinyl chloride, vinyl bromide, vinylidene chloride, vinylidene flouride, vinylidene chloride, 1-chloro-1-flouroethylene, ethylene, styrene, 2-vinylpyridine, 4-vinylpyridine, 2-methyl-5-vinylpyridine.

These water-insolube copolymers may be dispersed by means of non-ionic dispersing agents, such as alkylphenoxypolyethoxyethanols having alkyl groups of about seven to eighteen carbon atoms and six to sixty or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing six to sixty or more moles of ethylene oxide with nonyl, dodecyl, tetradecyl, t-dodecyl, and the like mercaptans or with alkythiophenols having alkyl groups of six to fifteen carbon atoms; ethylene oxide derivatives of long-chained carboxylic acids, such as lauric, myristic, palmitic, oleic, and the like or mixtures of acids such as found in tall oil containing six to sixty oxyethylene units per molecule; analogous ethylene oxide condensates of long-chained alcohols, such as octyl, decyl, lauryl, or cetyl alcohols, ethylene oxide derivatives of etherified or esterfied polyhydroxy compounds having a hydrophobic hydrocarbon chain, such as sorbitan monostearate containing six to sixty oxyethylene units, etc.; block copolymers of ethylene oxide and propylene oxide comprising a hydrophobic propylene oxide section combined with one or more hydrophilic ethylene oxide sections. The concentration of the water-insoluble polymer may be from ½ to 5% in the aqueous medium by which it is applied, either simultaneously with the N-methylol-acrylamide or before or after the application of the N-methylol-acrylamide. These auxiliary agents may be used in amouts which serve to modify the hand from a soft to a firm or stiff hand, depending upon what is desired and depending up the selection of comonomers used in any copolymer thus applied.

The fabric treated in accordance with the present invention may be a dyed fabric but, if not, the pigments and/or dyes may be included in the aqueous solution used to apply the cross-linking agent or any other auxiliary treating agent. A dye or pigment may be applied by printing or dyeing the fabric after the completion of the creaseproofing treatment of the present invention.

The reaction of the N-methylol-acrylamide and/or other condensate with the cellulose may be effected during or after drying of the impregnated fabric, as in a curing oven. The polymerization reaction can, however, also be carried out while the sample is still immersed in the aqueous impregnation medium. The advantage of such application is that the cellulose is in a swollen state during the cross-linking treatment and the cross-links formed stabilize the more open structure of the cellulose as it exists in the swollen state. As a result, the moisture absorbing ability of the cellulose is enhanced and the wet crease-recovery is increased to a greater extent than the dry crease-recovery.

The same pattern of results is obtained if a dry-state acid-catalyzed cure (etherification) is followed by a wet-stage polymerization and if a wet-stage polymerization is followed by a dry-state acid-catalyzed cure.

Instead of N-methylol-acrylamide, N-methylol derivatives of the amides of methacrylic acid, fumaric acid, maleic acid, itaconic acid, or of the dimer of methacrylic acid may be employed. Also useful are: N-methyl-N-methylol - acrylamide, the corresponding N-methyl-N-methylol derivatives of the amides of the acids just mentioned, and the methylated derivatives of any of the methylol derivatives mentioned in this paragraph, such as N-methoxymethylacrylamide and N-methoxymethyl-methacrylamide. These compounds may be represented by the general formula:

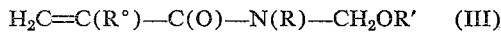

$$H_2C=C(R°)-C(O)-N(R)-CH_2OR' \quad (III)$$

where R, R°, and R' are individually selected from the group consisting of hydrogen and methyl.

Essentially the product of the present invention is a textile material formed of cellulosic fibers cross-linked by an acrylic addition polymer and an aminoplast, the cellulose and the polymer of the cross-linked product being joined by a plurality of linkages including many of the formula

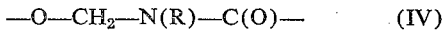

$$-O-CH_2-N(R)-C(O)- \quad (IV)$$

in which the carbon atom of the carbonyl group is attached directly to the carbon atom backbone or main chain of the arcylic polymer and the ether oxygen atom is connected directly to the cellulose residue. R may be hydrogen or a methyl group. Other linkages are also involved as a result of the reaction with the other formaldehyde condensate used herein.

In accordance with the present invention, there may also be provided new compositions comprising N-methylol-acrylamide or the like and a condensate of formaldehyde with a member selected from the group consisting of urea, N,N'-ethyleneurea, N,N'-trimethyleneurea, an aminotriazine, such as melamine, and one of the 5-substituted-tetrahydro-s-triazones described hereinabove in which the ratio of the N-methylol-acrylamide to the other condensate is from 5:1 to 4:3. This composition may be dry or it may be an aqueous paste or solution having a solids concentration of about 11% to 60% by weight. Besides the N-methylol-acrylamide and condensate, it may contain a polymerization inhibitor, such as phenol or hydroquinone, in an amount of about 0.005 to 0.1% on total weight of the composition; one or more other of the monomers mentioned hereinabove; and/or one or more other supplemental materials, such as a hand-modifier or builder, softener, or water-repellent agent. To use the composition, it is merely necessary to add water to form the proper concentration for application if it is not already at this concentration and to add a free-radical initiator with or without a separate acid catalyst as discussed hereinabove.

In the following examples, which are illustrative of the present invention, the parts and percentages are by weight unless otherwise indicated. The tests whose results are given in the examples are performed on the treated fabric after being conditioned at 70° F. and 65% relative humidity. The tensile strength is given in pounds per inch width. The crease-recovery angle is the angle obtained by the standard method of testing therefor. In all cases, unless otherwise indicated, the values given for the test are for the warp direction.

*Example 1*

A solution was prepared containing 5% by weight of dimethylol-N,N'-ethyleneurea, 12.5% by weight of N-methylol-acrylamide, 1% by weight of the hydrochloride of 2-amino-2-methyl-propanol-1 and 0.2% by weight of ammonium persulphate. Cotton printcloth fabrics (80 x 80) weighing 4 ounces per square yard were padded in the aqueous solution and squeezed between rollers to provide a wet pick-up of substantially 100%. After squeezing, the impregnated fabrics were supported on a frame and cured on a well-ventilated oven at 150° C. for 8 minutes. The cured fabrics were then washed in hot water containing 0.2% sodium nitrite and rinsed in cold water. The washed fabrics were then hung on a line to dry. The increase in weight of the fabric resulting from the treatment amounted to 11.7%. The dry crease-recovery angle determined in the warp direction was 132°. After 5 Sanforize washes, the crease-recovery angle was still 132°. The fabric was subjected to the AATCC chlorine damage test Number 69–1958. The loss in tensile strength after the test was 0%. When the test was performed on the crease-proofed fabrics after being subjected to 5 Sanforize washes, the loss in tensile strength was only 8%.

When a fabric prepared in the same manner but without the dimethylol-N,N'-ethyleneurea is tested, the increase in weight amounted to 8%, the original dry crease-recovery angle was 122°, and this decreased to 121° after 5 Sanforize washes. After the AATCC chlorine damage test, the fabric suffered a 22% loss in strength and an 18% loss when the chlorine damage test was applied to a piece of the fabric after 5 Sanforize washes. Similarly, when the fabric was subjected to the same treatment, except that the N-methylol-acrylamide was omitted, the dry crease-recovery angle obtained was 108°, and this angle on measurement after 5 Sanforize washes was found to be 110°. After the AATCC chlorine damage test, the fabric lost 38% of its tensile strength, and after subjecting a portion of the fabric to 5 Sanforize washes and then to the chlorine damage test, this tensile strength loss amounted to 66%.

*Example 2*

An aqueous solution was prepared containing 10% by weight of N-methylol-acrylamide, 6% by weight of a water-soluble melamine-formaldehyde condensate consisting essentially of trimethylol-melamine, 1% by weight of the hydrochloride of 2-amino-2-methyl-propanol-1 and 0.2% of ammonium persulphate. A cotton fabric of the type described in the Example 1 was padded through this solution and squeezed between rollers to provide an approximate 100% wet pick-up, the fabric obtained showing an increase in weight (dry) of 10%. The squeezed fabrics were supported on a frame and cured as in Example 1. The dry crease-recovery angle was found to be 124°. The loss of tensile strength on subjection to the AATCC chlorine damage test amounted to 6.4%. When a portion of the fabric was subjected to 5 Sanforize washes and then to the chlorine damage test, it showed a loss of 9.2% in tensile strength.

*Example 3*

An aqueous solution was prepared containing 10% by weight of N-methylol-acrylamide, 4.5% of 5-hydroxyethyl-1,3-dimethylol-tetrahydro-s-triazone-2, 1.5% of dimethylolurea, 1% of the hydrochloride of 2-amino-2-methylpropanol-1 and 0.2% of ammonium persulphate. The cotton fabrics were impregnated and squeezed as in Example 1 so that the increase in weight of the dyed fabric amounted to 10.5%. After squeezing, the fabric was cured at 160° C. for 3.5 minutes. The dry crease-recovery angle was found to be 129°, and after 5 Sanforize washes, it was 131°. After subjection to the AATCC chlorine damage test, the fabric showed no loss in strength, and only 4% loss in strength when such test was performed on a sample which had been subjected to 5 Sanforize washes.

*Example 4*

An aqueous solution was prepared containing 10% by weight of N-methylol-acrylamide, 4.5% of 5-ethyl-1,3-dimethylol-tetrahydro-s-triazone-2, 1.5% of dimethylolurea, 1% of the hydrochloride of 2-amino-2-methyl-propanol-1 and 0.2% of ammonium persulphate. The cotton fabrics were impregnated and squeezed as in Example 1 so that the increase in weight of the dried fabric amounted to 10.5%. After squeezing, the fabric was cured at 160° C. for 3.5 minutes. The dry crease-recovery angle was found to be 131°, and after 5 Sanforize washes, it was 131°. After subjection to the AATCC chlorine damage test, the fabric showed no loss in strength, and even after 5 Sanforize washes, there was no evidence of any loss in strength.

*Example 5*

Two impregnating solutions were prepared. Solution A contained 12.5% by weight of N-methylol-acrylamide, 1% by weight of the hydrochloride of 2-amino-2-methylpropanol-1 and 0.2% by weight of ammonium persulfate. Solution B contained 5% by weight dimethylol-N,N'-ethyleneurea and 0.1% by weight ammonium chloride. Each of these solutions was padded on a separate cotton fabric as described in Example 1 and the impregnated fabric was heated at 150° C. for 3.5 minutes. The fabric was then rinsed and line-dried. A portion of each fabric was then treated with the other solution, cured and washed as described above. The results are shown below.

| First Treatment | A | | B | |
|---|---|---|---|---|
| Second Treatment | None | B | None | A |
| Increase in weight, percent | 8 | 10 | 2.5 | 10.4 |
| Dry-crease recovery angle, degrees | 122 | 135 | 114 | 113 |
| Tensile strength loss by the AATCC chlorine damage test, percent | 22 | 1 | 24 | 60 |
| Tensile strength loss by the AATCC chlorine damage test carried out on samples which were previously subjected to 5 Sanforize washes, percent | 18 | 4.3 | 84 | 77 |

I claim:
1. A process of treating a textile material of cellulose fibers which comprises impregnating the material with an aqueous solution containing (A) 5 to 20% by weight of N-methylol-acrylamide, (B) a condensate which normally picks up chlorine, containing at least 2 N-methylol groups, of formaldehyde with a member selected from the group consisting of urea, N,N'-ethyleneurea, and melamine, the weight ratio of (A) to (B) being from 5:1 to 4:3, and (C) acidic catalytic material selected from the group consisting of (1) a water-soluble free-radical polymerization initiator of acidic character at a concentration of 1/10 to 3% by weight and (2) a mixture of a water-soluble free-radical polymerization initiator selected from the group consisting of neutral and acidic initiators at a concentration 1/10 to 3% by weight and a water-soluble acidic catalyst, other than a polymerization initiator, for the etherification reaction of the methylol groups of (A) and (B), with hydroxyl groups of the cellulose at a concentration of about 0.05 to 1% by weight, the percentages being based on the total weight of solution, and subsequently heating the impregnated material at a temperature of about 105° to 205° C. until cross-linking of the cellulose is obtained.

2. As an article of manufacture, a textile material which is the product of the process of claim 1.

3. A process for treating a textile material of cellulose fibers which comprises impregnating the material with an aqueous solution containing (A) 5 to 20% by weight of N-methylol-acrylamide and 0.1 to 3% by weight of a neutral water-soluble free radical polymerization initiator, the percentages being based on the total weight of solution, addition polymerizing said acrylamide in situ in the fabric, impregnating the material with (B) a condensate, which normally picks up chlorine, containing at least 2 N-methylol groups, of formaldehyde with a member selected from the group consisting of urea, N,N'-ethyleneurea, and melamine, the weight ratio of N-methylol-acrylamide to the condensate being from 5:1 to 4:3, and reacting N-methylol groups of the polymerized acrylamide and of the condensate with hydroxyl groups of the cellulose in the presence of a water-soluble acidic catalyst, other than a polymerization initiator, for the etherification reaction of the methylol groups of (A) and (B), with hydroxyl groups of the cellulose, the last-mentioned reacting step being effected at a temperature of about 105° to 205° C. until cross-linking of the cellulose is obtained.

4. A process as defined in claim 3 in which the textile material is a cotton fabric and the polymerization is effected in the wet state while the material is suspended in the aqueous solution of the N-methylol-acrylamide and the initiator at a temperature of 25° to 100° C.

5. As an article of manufacture, a textile material which is the product of the process of claim 4.

6. A process as defined in claim 3 in which the textile material is a regenerated cellulose fabric and the polymerization is effected in the wet state while the material is suspended in the aqueous solution of the N-methylol-acrylamide and the initiator at a temperature of 25° to 100° C.

7. As an article of manufacture, a textile material which is the product of the process of claim 6.

8. A process of treating a textile material of cellulose fibers which comprises impregnating the material with an aqueous solution containing (A) 5% to 20% by weight of N-methylol-acrylamide, (B) a condensate which normally picks up chlorine, containing at least 2 N-methylol groups, of formaldehyde with a member selected from the group consisting of urea, N,N'-ethyleneurea, and melamine, the weight ratio of (A) to (B) being from 5:1 to 4:3, and 1/10 to 3% by weight of an alkali metal persulfate or ammonium persulfate, the percentages being based on the total weight of solution, and then heating the impregnated material at a temperature of about 105° to 205° C. until cross-linking of the cellulose is obtained.

(References on following page)

References Cited by the Examiner

UNITED STATES PATENTS

| | | | |
|---|---|---|---|
| 2,173,005 | 9/1939 | Strain. | |
| 3,125,405 | 3/1964 | Gardon | 8—116.3 |
| 3,125,406 | 3/1964 | Herman | 8—116.3 |

OTHER REFERENCES

Wayland, Textile Research Journal, February 1959, pages 170–179.

NORMAN G. TORCHIN, *Primary Examiner.*

H. WOLMAN, *Assistant Examiner.*